T. J. STURTEVANT.
MACHINE FOR MIXING MATERIALS.
APPLICATION FILED APR. 24, 1918.

1,360,468.

Patented Nov. 30, 1920.
5 SHEETS—SHEET 1.

Inventor:
Thomas J. Sturtevant
by
Attorney

T. J. STURTEVANT.
MACHINE FOR MIXING MATERIALS.
APPLICATION FILED APR. 24, 1918.

1,360,468. Patented Nov. 30, 1920.
5 SHEETS—SHEET 4.

Inventor
Thomas J. Sturtevant
by
Roff P. Hains
Attorney

T. J. STURTEVANT.
MACHINE FOR MIXING MATERIALS.
APPLICATION FILED APR. 24, 1918.

1,360,468.

Patented Nov. 30, 1920.
5 SHEETS—SHEET 5.

Inventor:
Thomas J. Sturtevant
by
Rob't P. Hains
Attorney

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

MACHINE FOR MIXING MATERIALS.

1,360,468.     Specification of Letters Patent.     Patented Nov. 30, 1920.

Application filed April 24, 1918. Serial No. 230,395.

*To all whom it may concern:*

Be it known that I, THOMAS J. STURTEVANT, a citizen of the United States, residing at Wellesley, county of Norfolk, and State of Massachusetts, have invented an Improvement in Machine for Mixing Materials, of which the following description, in connection with the accompanying drawings, is a specification, like characters on the drawings representing like parts.

The invention to be hereinafter described relates to machines for mixing fertilizers and other materials.

The character of the ingredients of fertilizers is such that it tends to adhere and pack on the parts of the machine, thereby choking and reducing the efficiency thereof. Consequently, it is desirable to be able to have ready access to the interior of the machine for the purpose of cleaning the internal parts thereof. One of the objects of the present invention is to provide a mixing machine constructed and arranged to enable convenient access to the internal parts thereof without dismantling the machine.

It is important that machines for mixing fertilizers should have a dust-tight closure in order that the materials may not escape therefrom and cause discomfort or injury to the workman tending the machine, or engaged in the room in which the machine is placed. Another object of the invention is to provide a machine with a casing having provision for preventing escape of dust therefrom.

Another object of the invention is to provide a mixing machine having a desirable construction and arrangement of lifting buckets and vanes for producing efficient mixing of the ingredients introduced into the machine.

And another object of the invention is to provide a machine having a casing with an opening which may serve both to introduce the materials into the casing and to deliver the mixed material therefrom.

With the aforesaid and other objects in view, the character of the invention may be best understood by reference to the following description of one good form thereof shown in the accompanying drawings, wherein.

Figure 1:
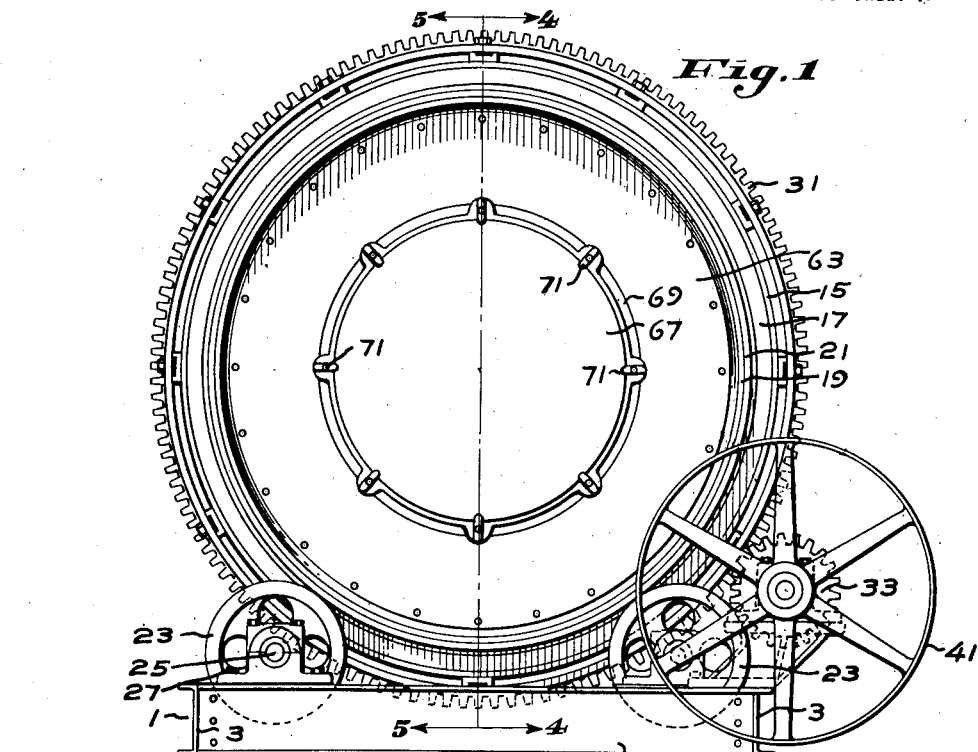
Figure 1 is a side elevation of the machine shown herein as one embodiment of the invention.
Figure 2:
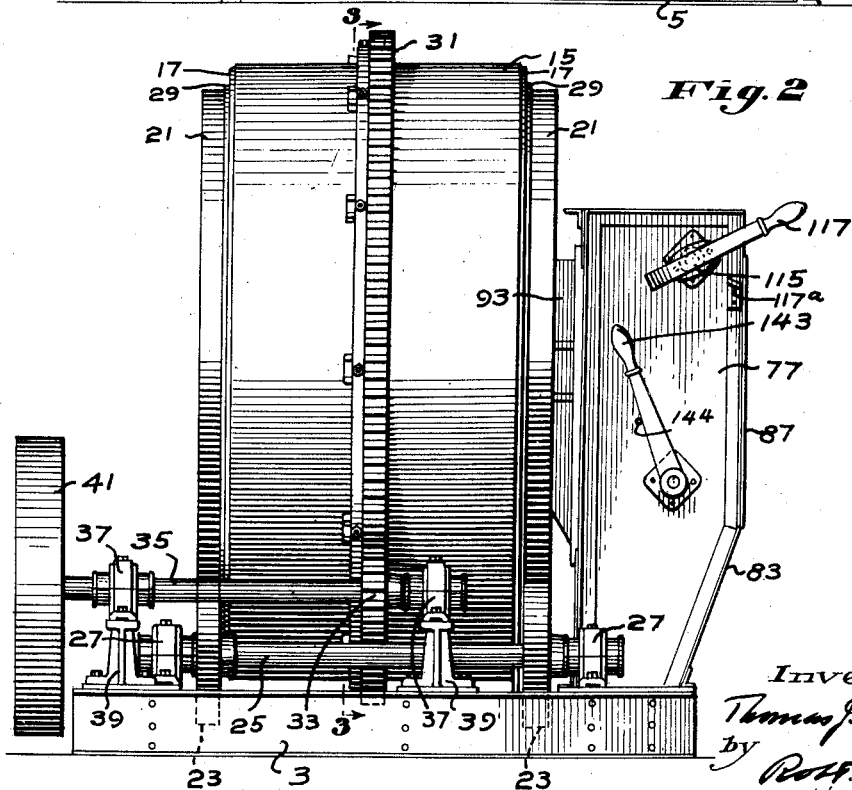
Fig. 2 is an end elevation of the machine.
Figure 3:
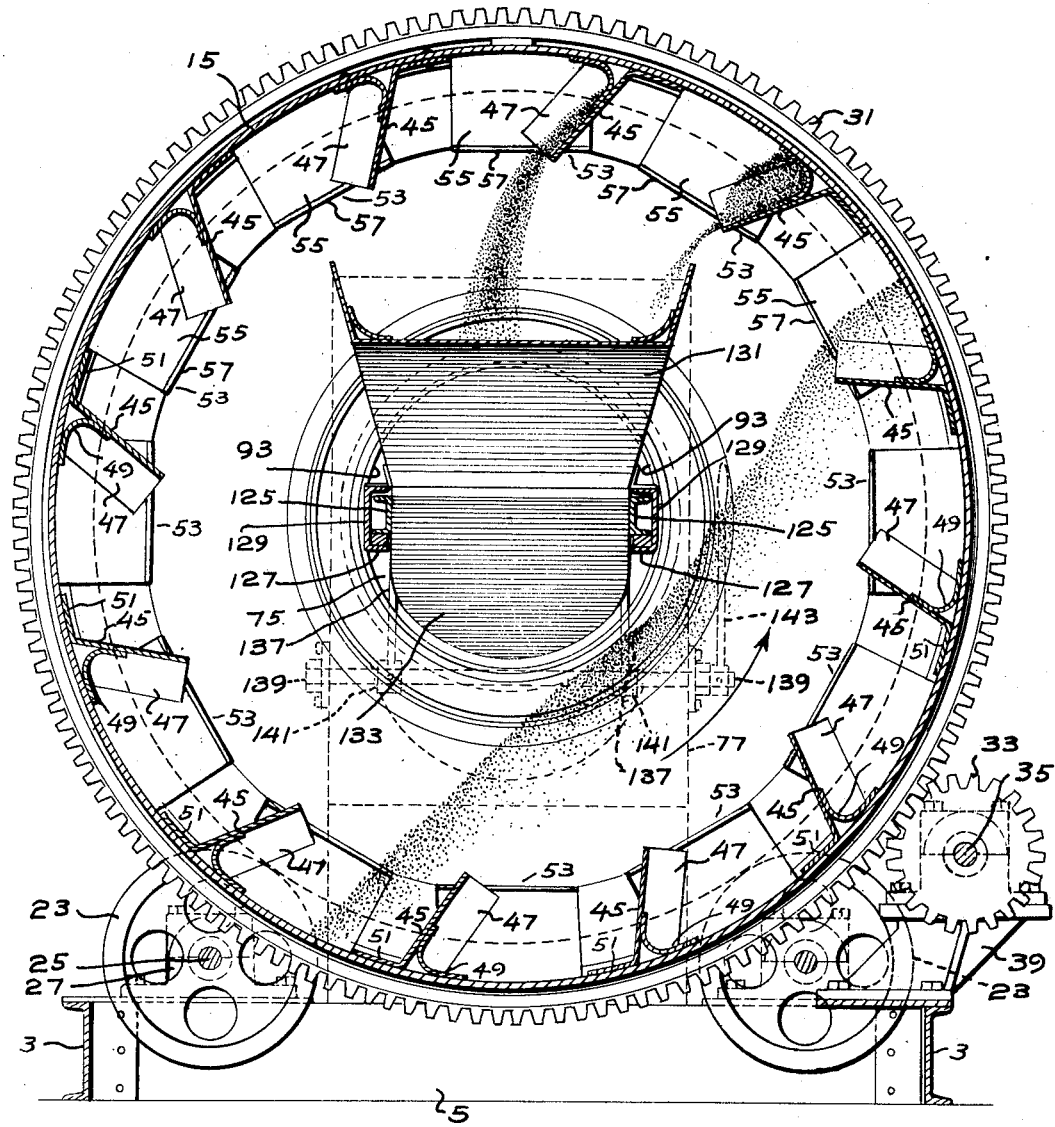
Figure 4:
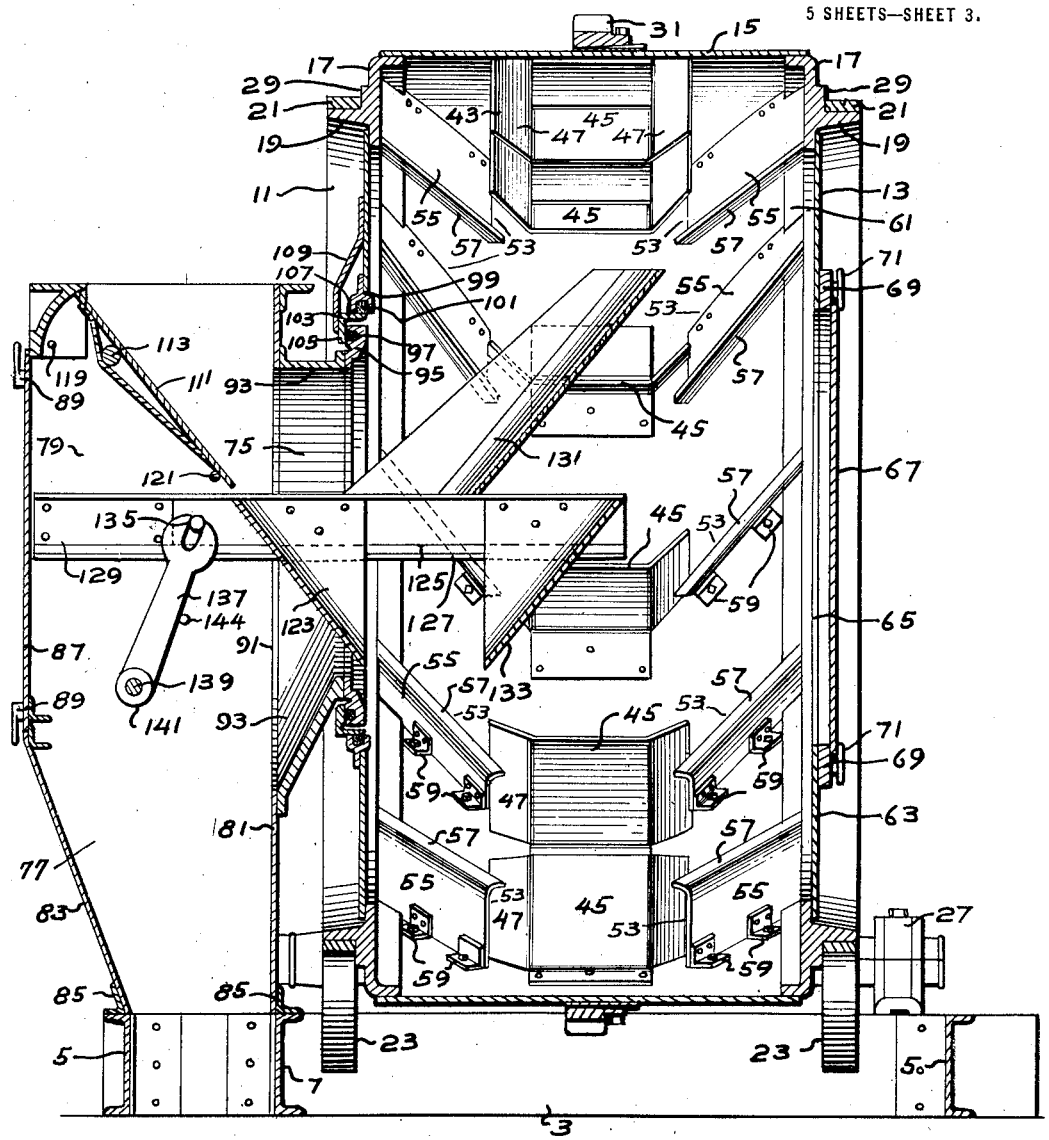
Figure 5:
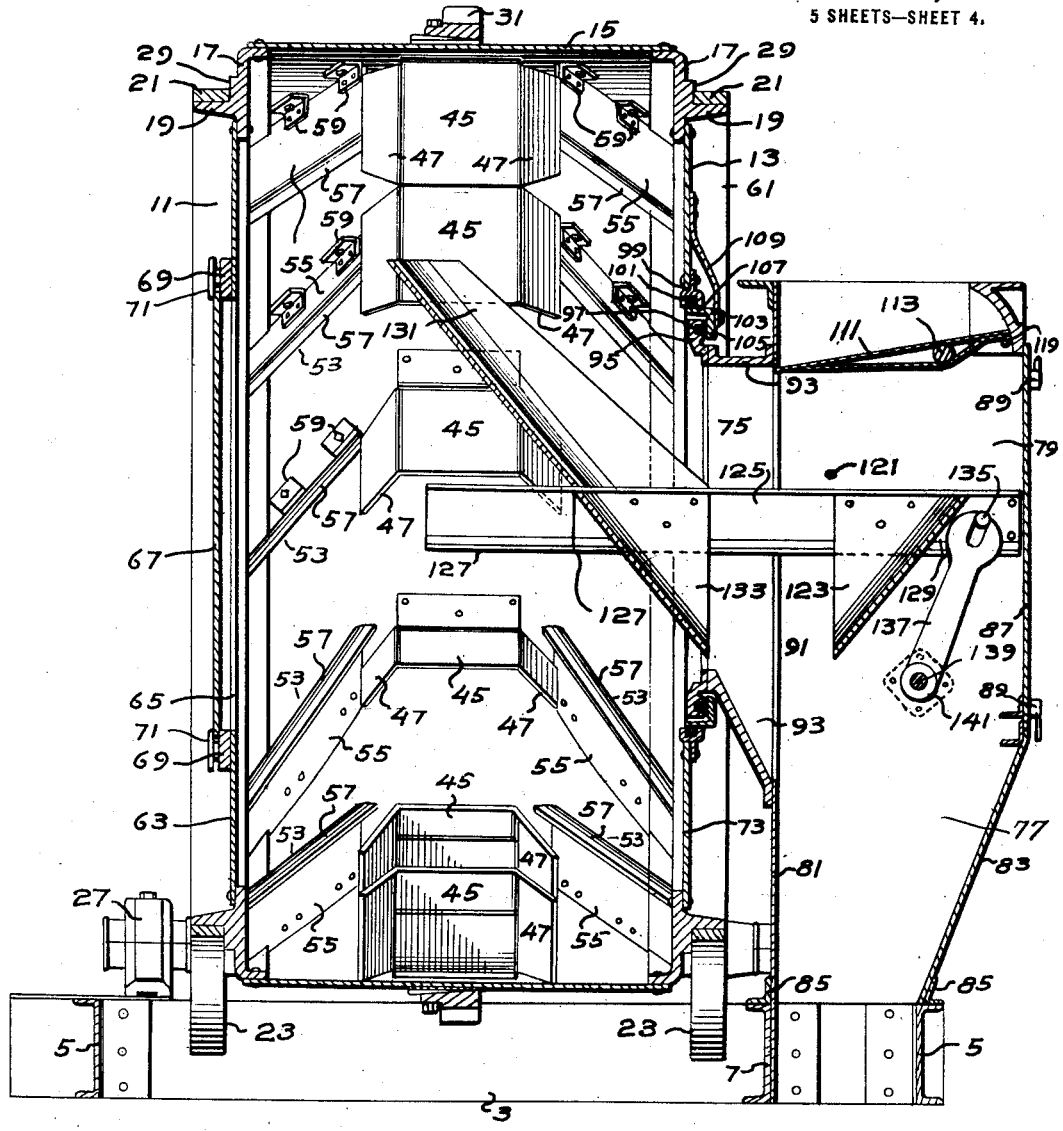
Figure 6:
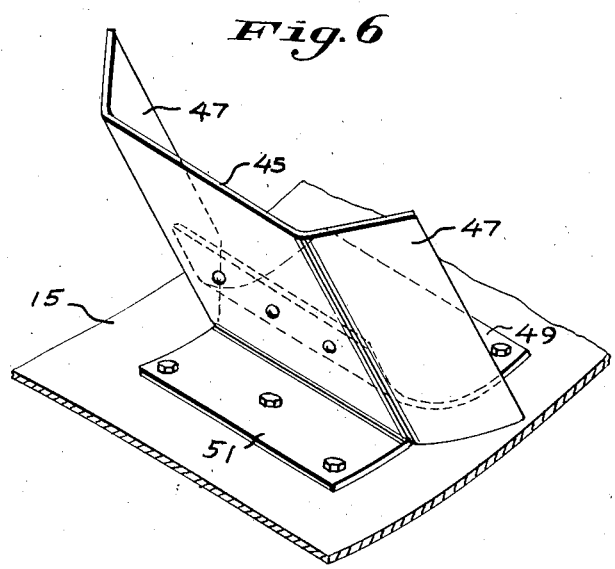

Fig. 3 on an enlarged scale is a vertical section taken on line 3—3 of Fig. 2;

Fig. 4 on an enlarged scale is a vertical section taken on line 4—4 of Fig. 1 looking toward the right;

Fig. 5 on an enlarged scale is a vertical section taken on line 5—5 of Fig. 1 looking toward the left;

Fig. 6 is a perspective view of one of the lifting buckets; and

Figure 7:
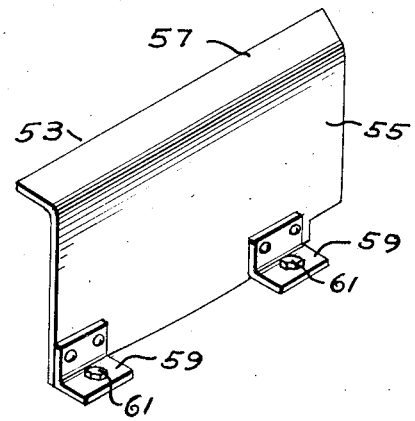

Fig. 7 is a perspective view of one of the lifting and deflecting vanes.

Referring to the drawings, the machine shown therein as one embodiment of the invention, comprises a base 1, in the present instance, formed of longitudinal channel bars 3 connected by outer transverse channel bars 5 and an intermediate channel bar 7.

This base serves to support a rotary casing, in the present instance, in the form of a drum comprising opposed heads 11 and 13 and a cylindrical shell 15 secured thereto. Each head may be provided with a ring 17 conveniently in the form of a casting provided with an outwardly projecting circular flange 19 having a steel tire 21 shrunk thereon. These tires may rest upon rollers 23 fast on shafts 25 journaled in bearings 27 mounted on the base. The rings 17 may have circumferential shoulders 29 (Figs. 4 and 5) adapted to engage the inner edges of the rims of the rollers 23 to limit movements of the drum in the direction of the axis thereof.

Suitable means may be provided for rotating the drum. To accomplish this, in the present instance, a large ring gear 31 is secured to the cylinder 15 of the drum, preferably centrally between the ends thereof, and is driven by a pinion 33 (Figs. 1, 2 and 3) fast on a shaft 35 journaled in bearings 37 in brackets 39 mounted on the base. The shaft 35 may have a pulley 41 fast thereon for receiving a belt which may be driven by any suitable source of power.

The drum may be provided with suitable buckets, vanes or equivalent members for efficiently mixing the materials introduced into the drum. For this purpose, in the present instance, a series of lifting buckets 43 are provided, each comprising a bottom 45 (Fig. 6), outwardly inclined sides 47, a curved back 49 and a flange 51. The curved back and the flange may be bolted or otherwise secured to the inner wall of the cylinder 15 of the drum. The bottom of the bucket may form an obtuse angle with its flange, as will be noted in Fig. 3, so that the bucket will incline forwardly with respect to the cylinder and enable the bucket to readily catch and lift the materials, as more fully hereinafter described. This series of buckets may be located intermediate the heads of the drum, in the present instance, said buckets being midway between said heads.

Suitable means may be provided for lifting and deflecting the materials inwardly from the heads of the drum. In the present instance, this means also delivers the materials to the lifting buckets described. This lifting and deflecting means, in the present form of the invention, comprises series of vanes 53, each comprising a bottom 55 (Fig. 7), an upturned flange 57 at the free edge thereof, and brackets 59 at the opposite edge thereof. The latter edge may be curved to conform to the contour of the inner wall of the cylinder 15, and the brackets may be secured thereto by bolts 61 or other suitable means. These vanes may abut against the heads 11 and 13 and preferably are arranged obliquely to the axis of the drum with the ends adjacent the heads in advance of the opposite or delivery ends thereof. The construction is such that as the vanes rise from their lowest to highest positions in the course of the rotation of the drum, they will lift and deflect the materials thereon inwardly away from the heads of the drum, and in the present instance, the material sliding from the vanes will be delivered into the buckets and be lifted thereby.

The head 11 of the drum is provided with a circular plate 63 (Figs. 1, 4 and 5) riveted to the rings 17, referred to, and provided with a large central opening 65 normally closed by a cover or door 67 detachably secured to a frame 69 surrounding said opening by suitable latches 71. The construction is such that the latches may be readily released and the cover removed to permit convenient access to the parts within the drum as desired.

The opposite head 13 of the drum may be provided with a plate 73 riveted to the ring 17 of said head, said plate being provided with a large opening 75 through which the materials may be introduced into and delivered from the drum.

To conduct the materials into the drum, a spout or casing 77 may be provided, in the present instance, comprising ends 79, an inner side 81 and an outer side 83, the latter being preferably inclined inwardly adjacent the lower end thereof, as will be noted in Figs. 4 and 5. The casing 77 may be mounted on the base above the channel bar 7 and one of the outer channel bars 5 which may conveniently constitute a continuation of the spout of the casing 77. The lower end of the casing may be secured to the upper flanges of said channels 5 and 7 by angle bars 85 riveted thereto. The casing 77 may have an outer opening in the wall 83 normally closed by a cover or door 87 detachably secured to said wall by suitable latches 89 to enable convenient access to the interior of said casing.

The inner wall of said casing may have an opening 91 therein, said wall being provided with a neck 93 projecting inwardly toward the opening 75 of the drum. To prevent escape of dust at the juncture of the neck with the opening of the drum, the neck may be provided with a ring 95 having a circular groove formed therein to receive suitable packing 97, and the plate 73 of the head 13 of the drum may have a ring 99 secured thereto provided with a groove receiving suitable packing 101. An angle ring 103 may have a flange 105 for engagement with the neck packing 97, and may have a flange 107 for engagement with the drum packing 101. The ring may be pressed inwardly to cause its flange 105 to engage the packing 97 by leaf springs 109 having outer ends connected to the drum and inner ends connected to the ring 103. The construction is such that the drum may be susceptible of a slight wabbling or movement in the direction of the axis thereof without loss of engagement of the flanges of the ring 103 with the neck and drum packings. As a consequence, escape of dust at the juncture of the drum with the neck is effectively prevented.

To control the feed of material into the spout or casing 77, in the present instance, a valve or gate 111 is provided fast on a shaft 113 mounted in bearings 115 on opposed sides of said casing. One end of the shaft projects outwardly from the casing to receive a controlling handle 117. The closed position of the valve or gate may be determined by the engagement of one edge thereof with stop pins 119 projecting inwardly from the opposed walls of the casing. To hold the gate in its closed position (Fig. 5) the handle may be of resilient metal and adapted to snap over a latch 117ᵃ (Fig. 2) fast on the outer side of the casing 77. This gate or valve may also serve to guide the materials flowing into the casing toward the opening 91 thereof leading to the neck 93. To accomplish this, said gate or valve may be rocked, to the position shown in Fig. 4 determined by its engagement with the stop pins 121 projecting inwardly from opposed walls of the casing.

Suitable means may be provided to guide the materials flowing from the gate or valve 111 through the neck into the drum. To accomplish this, in the present instance, a chute 123 may be provided having the upper ends of its sides riveted or otherwise secured to a slide or carrier conveniently in the form of channel bars 125 adapted to slide in tracks conveniently in the form of channel bars 127. These channel tracks may have end portions 129 riveted or otherwise secured to opposed walls of the spout or casing 77, and may have portions projecting through the neck a substantial distance into the interior of the drum substantially centrally thereof.

The construction is such that materials introduced into the spout may slide along the gate or valve 111 and thence along the chute 123 and be delivered to the vanes 53 adjacent the head 13. As the drum rotates, the materials will be lifted by said vanes and deflected inward to the lifting buckets. When the latter approach the highest point of their travel, they will discharge the materials downward toward the axis of the drum.

Suitable means may be provided to receive the materials as they fall from the lifting buckets toward the axis of the drum. To accomplish this, in the present instance, a chute 131 may be provided conveniently mounted on the channel tracks 127, referred to, and inclining from a point adjacent the neck upwardly into the drum. The construction is such that materials falling from the buckets will drop into the chute 131 and be deflected thereby into the path of the material flowing into the drum, thereby contributing to the efficient mixing of the ingredients of the materials.

Preferably the materials are fed into the drum in batches. The batch fed into the drum is thoroughly mixed by continuing rotation thereof for the time required. Then it is desirable to discharge the materials from the drum. To accomplish this, in the present instance, a chute 133 may be provided having the upper ends of its sides riveted or otherwise secured to the channel slides 125 which carry the in-feed chute 123, referred to. To effect the discharge, the carrier for said chutes may be moved outwardly from its position shown in Fig. 4 to its position shown in Fig. 5, thereby moving the in-feed chute 123 out of registry with the gate or valve 111 and moving the out-feed chute 133 into registry with the chute 131. Then the materials delivered to the chute 131 will flow from the latter along the out-feed chute 133 and pass through the lower end of the spout or casing 77.

Suitable means may be provided for adjusting the chute carrier to the positions described. To accomplish this, in the present instance, the channels 125 of the carrier may be provided with studs 135 receiving the upper forked ends of arms 137 fast on a shaft 139 mounted in bearings 141 in opposed sides of the spout. One end of this shaft may be extended outwardly beyond the chute to receive a controlling handle 143 (Fig. 2). In the present instance, the gate handle 117 and the carrier handle 143 are located at the same side of the spout, so that the operator may grasp one with one hand, and the other with the other hand, and conveniently control both the gate and carrier. The arms 137 may engage stops 144 to limit the movement of the carrier.

If access is desired to the interior of the spout, or drum, through the opening in the spout normally closed by the door 87, the latter is removed. Then the handle 143 may be rocked to shift the forked arms 137 in a clockwise direction (Fig. 5) sufficiently to cause the forked ends of said arms to escape from the studs 135. Then the carrier together with its chute may be slid along the channel tracks 127 out through the opening in the spout or casing. This will leave the combined inlet and outlet opening of the drum substantially unobstructed, and enable convenient access to the parts within the drum.

The large openings in the opposite heads of the drums enable prompt and easy access to all of the parts within the drum, thereby desirably facilitating the cleaning and repair of said parts to maintain the same in efficient working condition.

This mixing machine may form a part of an apparatus for elevating, grading, mixing, weighing and bagging fertilizers. In such use a spout would be connected to the upper end of the spout or casing 77, and a spout would be connected to the lower end thereof. In such an apparatus at times it is desirable to cut out the mixer and by-pass the materials. The construction of the machine shown herein lends itself admirably for this purpose. When it is desired to by-pass the materials, it is merely necessary to shift the carrier so that the feed chutes are in the positions shown in Fig. 5, and to rock the gate 111 to its downwardly inclined position shown in Fig. 4. Then the materials flowing along said gate will be deflected by the out-feed chute past the drum without entering therein.

The provision of the single spout or casing to serve the dual function of introducing the materials into and conducting the same from the drum has important advantages. It greatly simplifies the spouting and connections with the drum, enables convenient access to the interior of the drum through the opposite end which is totally unobstructed, enables the control of the machine by one operative at one end thereof, enables the drum to be removed from its base without disturbing the spouting, and contributes to the ease of rendering the machine dust tight, since merely one joint is required at the juncture of the drum with the neck of the spout.

It will be understood that the invention is not limited to the specific embodiment shown, but that various deviations may be made therefrom without departing from the spirit and scope of the appended claims.

What is claimed is:—

1. A mixer comprising, in combination, a rotary drum having opposed heads and a shell between them, one of said heads having an opening therein, two series of vanes on said shell adjacent said heads respectively, for directing materials toward a vertical plane cutting the center of said shell, a series of lifting buckets on said shell intermediate the series of vanes for receiving the materials from said vanes and elevating the same, a fixed inclined chute for receiving the materials from said lifting buckets and deflecting them to a position within the drum adjacent one of said heads throughout the rotary operation of the drum.

2. A mixer comprising, in combination, a rotary drum having a shell and opposed heads, one of said heads having an inlet and outlet opening serving both to admit materials to and discharge the same from the drum, a series of lifting buckets mounted on said shell intermediate said heads, two series of deflecting vanes at opposite sides of said series of buckets for deflecting the materials to said buckets, a chute in the drum to receive the materials from said buckets and feed the same toward said inlet and outlet opening, and means to deliver the materials through said opening to said drum or deliver the materials from said chute.

3. A mixer comprising, in combination, a rotary drum having opposed heads and a shell between them, one of said heads having an opening therein, a series of lifting buckets mounted on said shell, vanes for deflecting the materials toward said buckets, a fixed inclined chute mounted in the casing for receiving the materials from the buckets and directing the same toward said opening, a fixed casing having an opening for receiving the materials upon said casing, a support mounted on said fixed chute and projecting into the rotary drum, a pair of chutes movably mounted on said support, one to direct materials from said fixed chute into the fixed casing, and the other to direct materials from the fixed casing into the rotary drum, and a door for said fixed casing adapted to open to allow removal of the movable chutes therethrough from the fixed casing.

4. A machine for mixing materials, comprising, in combination, a rotary casing having an opening in one of its ends, members mounted in the casing for mixing the materials, a chute for feeding materials through said opening into said casing, another chute for feeding the materials from said casing through said opening, and means for adjusting said chutes to and from active positions.

5. A machine for mixing materials, comprising, in combination, a rotary casing having an opening in one of its ends, members mounted in the casing for mixing the materials, a chute for feeding materials through said opening into said casing, a separate chute for feeding the materials from said casing through said opening, and a carrier for said chutes for adjusting the same alternatively to and from active positions.

6. A machine for mixing materials, comprising, in combination, a rotary casing having an opening in one of its ends, members mounted in the casing for mixing the materials, a chute for feeding materials through said opening into said casing, a chute for feeding the materials from said casing through said opening, a carrier for said chutes, a support for said carrier, and means to adjust said carrier relatively to said support to move said chutes to and from active positions.

7. A machine for mixing materials, comprising, in combination, a rotary casing having an opening in one of its ends, members mounted in the casing for mixing the materials, an adjustable chute for feeding materials through said opening into said casing, a second adjustable chute supported in spaced relation to the first-mentioned chute for feeding the materials from said casing through said opening, a carrier for said chutes, a support for said carrier, rocker arms connected to said carrier, a shaft for said arms, and a handle for rocking said shaft to shift said chutes to and from active positions.

8. A machine for mixing materials, comprising, in combination, a rotary casing having an opening in one of its ends, a fixed casing having an opening communicating with said rotary casing opening, members mounted in the rotary casing for mixing the materials, a chute for feeding materials through said openings into said casing, a separate chute supported in spaced relation to the first-mentioned chute for feeding the materials from said casing through said openings, a carrier for moving either of said chutes into operative position, a support for said carrier mounted on said fixed casing, and means to adjust said carrier along said support detachably connected to said carrier, that the latter may be removed from its support through said fixed casing.

9. A machine for mixing materials, comprising, in combination, a rotary casing having an opening therein for conducting materials into and from the casing, a fixed casing adjacent said opening, a support mounted on said fixed casing and projecting through said opening into said rotary casing, a carrier on said support, means on said carrier for guiding the materials from said fixed casing into said rotary casing, and from said rotary casing to said fixed casing through said opening, and members mounted in said rotary casing for mixing the materials therein.

10. A machine for mixing materials, comprising, in combination, a rotary casing having an opening therein for conducting materials to and from said casing, a fixed casing communicating with said opening for conducting materials to and from said rotary casing, members in said rotary casing for mixing the materials, a support mounted in said fixed casing and projecting from said opening into said rotary casing, a fixed chute mounted on said support, and a pair of chutes movable on said support to positions for conducting the materials into and from said rotary casing, respectively.

11. A machine for mixing materials, comprising, in combination, a rotary casing having an opening therein, a fixed casing having an opening communicating with said rotary casing opening, members in said rotary casing for mixing the materials therein, and separate means for guiding the materials from said fixed casing into said rotary casing, or from said rotary casing to said fixed casing, or by-passing the materials through said fixed casing.

12. A machine for mixing materials, comprising, in combination, a rotary casing having an opening for conducting materials into and from said casing, a fixed casing adjacent said rotary casing communicating with said opening for delivering materials to said rotary casing, members in said rotary casing for mixing the materials, an adjustable chute for conveying the materials from said rotary casing through said opening, and an inlet gate operable independent of said chute for controlling the entrance to said fixed casing, said gate adjustable to one position for guiding the materials toward the opening in said rotary casing, and adjustable to a second position for closing the material receiving opening of the fixed casing.

13. A machine for mixing materials, comprising, in combination, a rotary drum having opposed heads with a shell between them, one of said heads having a material-receiving opening therethrough, means supported adjacent said opening for directing material into and out of said drum, a series of lifting buckets mounted in said shell intermediate said heads, two series of deflecting vanes at opposite sides of said series of buckets and adjacent said heads, a fixed incline chute supported within said drum for receiving materials from said lifting buckets and deflecting the same to a position within said drum adjacent said opening, said other head having an unobstructed opening therethrough to permit access to said buckets and vanes, and a door for closing said last-mentioned opening.

14. A machine for mixing materials comprising, in combination, a rotary casing having an opening therein for conducting materials into and from said casing, a fixed casing communicating with said opening, a support in said fixed casing, a carrier mounted upon said support to slide into said rotary casing through said opening, means upon said carrier for guiding the materials into said rotary casing, and from the rotary casing to the fixed casing, said fixed casing provided with an opening in a wall thereof opposite said first-mentioned opening to permit the carrier to be inserted therethrough to its operative position, a door normally closing the opening within the fixed casing, and members in said rotary casing for mixing the material therein.

15. A machine for mixing materials comprising, in combination, a rotary casing having an opening therein, a casing for conducting materials to said rotary casing through said opening, members in said rotary casing for mixing the materials therein, a chute movable to a position to conduct the materials into said rotary casing and movable to a second position to by-pass the materials through said fixed casing without entering the rotary casing.

16. In combination with the rotary casing of a mixing machine, a mixing bucket constructed to be secured to an inner wall of said casing, comprising a straight transversely-extending body portion having integral inclined flanges upon the opposite ends thereof, and means for securing said bucket to a wall of said casing including diverging flanges upon an edge of said body portion, and bolts for removably securing the same to said wall.

17. A machine for mixing materials, comprising, in combination, a rotary casing having an opening therein for the passage of materials, members in the rotary casing for mixing materials, a fixed casing having an opening adjacent the opening in the rotary casing and communicating therewith; a dust-tight flexible connection between said openings including a ring consisting of a cylindrical portion and a laterally projecting flange portion, said ring having its cylindrical portion slidably received in the opening of one casing, and means for yieldingly holding said flange portion in abutting engagement with a face of the other casing, to prevent escape of dust between said rotary and fixed casings.

In testimony whereof, I have signed my name to this specification.

THOMAS J. STURTEVANT.